United States Patent [19]

Palfalvy

[11] 4,159,590

[45] Jul. 3, 1979

[54] ANIMAL TRAP

[76] Inventor: Paul Palfalvy, 1105 Woodside Rd., Redwood City, Calif. 94061

[21] Appl. No.: 836,857

[22] Filed: Sep. 26, 1977

[51] Int. Cl.² .......................................... A01M 23/18
[52] U.S. Cl. ...................................................... 43/61
[58] Field of Search ................................ 43/60, 61, 74

[56] References Cited

U.S. PATENT DOCUMENTS

| | | | |
|---|---|---|---|
| 1,326,662 | 12/1919 | Kampfe | 43/61 |
| 1,415,093 | 5/1922 | Hurley | 43/61 |
| 2,551,903 | 5/1951 | Roberts | 43/61 |
| 2,589,002 | 3/1952 | Vonada | 43/61 |
| 2,643,480 | 6/1953 | Jones | 43/61 X |
| 3,113,395 | 12/1963 | Van Kuren | 43/61 |
| 3,729,852 | 5/1973 | Holmes | 43/61 |

*Primary Examiner*—Nicholas P. Godici
*Attorney, Agent, or Firm*—Julian Caplan

[57] ABSTRACT

A trap has a body having an end formed with a first opening. Rotatably mounted on the end is a closure shaped with a second opening. The closure has an open position with the openings aligned so the animal may enter the body and a closed position with the closure blocking the first opening to prevent escape. The closure is releaseably held in open position by a pin slideably mounted in the end passing through a hole in the closure. Bait in the body is connected by a cord to the pin so that when an animal attempts to carry off the bait the pin is pulled out of the hole and the closure pivots to closed position. A treadle may be mounted inside the body and connected to the cord. When an animal steps on the treadle it pivots to pull the cord away from the end to pull the pin as an alternative way to close the trap. Counterbalancing of the closure and of the treadle make the triggering of the closure very sensitive.

6 Claims, 3 Drawing Figures

ANIMAL TRAP

This invention relates to a new and improved animal trap and may be adapted to be produced in various sizes, the small size for mice and other household and garden rodents and a large size illustrated and described in detail herein for larger animals.

One of the features of the present invention is the provision on the front of the trap of a rotating door. As herein described, the door is practically silent as it revolves from open to closed position, which is important because even trigger noise alerts or panics animals into bolting from a trap. Such an undesirable result is avoided in the present invention. The door closure moves from the bottom up instead of dropping down, as in conventional traps. Thus closure commences as soon as the trigger is pulled. Even if the tail or foot of the animal partially blocks the closure, it is difficult or impossible for the animal to rotate the door in reverse and escape, for only a small portion remains open. Additionally, the closure is extremely rapid and the pin on which the closure rotates is made hard and smooth to reduce friction and prevent rusting.

Another feature of the invention is the provision of a trigger pin hole in the closure into which the trigger pin slides in the open position of the trap. This hole is of such size and shape that the door can be moved back and forth with the pin in the hole in order to make sure that the trigger balance is positive and active when setting the trap. Further, the hole occupies the attention of the trapped animal in an attempt to escape making the attempt ineffective or another hole may be provided for this purpose.

Still another feature of the invention is the fact that the closure load is carried on an independent bearing and is not a load on the trigger mechanism. Hence trigger sensitivity is controlled by a counter weight, which is the only force loading the trigger pin.

The trigger of the present invention, by which is meant the trigger pin itself and the weights that effect trigger sensitivity such as the counterbalance of the closure, the weight of the door of the closure itself and the like, provides extreme sensitivity. The heart of any trap is the trigger mechanism and the first requisite of the trigger is that it must be sensitive as well as being reliable and easily and positively set. Heretofore, in mechanically triggered traps, if the sensitivity is increased, reliability is sacrificed.

In the present invention the trigger mechanism positively blocks the rotating, adjustably counter-weighted closure so that jarring or shaking does not trip the trigger and the sensitivity of the blocking trigger pin is adjustable to any degree by adjusting the counterweight.

In a preferred embodiment of the present invention, the position of the counter-weight for the closure is adjustable — i.e., by use of threaded rod and an internally threaded weight. It will be understood, however, that other means of counter-weighting may be used. In any event the sensitivity of the trigger is easily adjusted from the exterior of the trap.

Sensitivity adjustment functions to set the door pressure which the door exerts on the trigger pin. Further, once the trigger pin is pulled, the adjustable weight moves over center due to the door closing motion and accelerates the closure since the weight of the counter-weight is added to that of the closure. Approximately 12° of rotation may be added to the closed position of the door by the means hereinafter described so that the possibility of an animal clawing the door open is eliminated.

Means is provided, as hereinafter explained, to reduce the friction of the sliding of the trigger pin so as to further increase sensitivity.

One important feature of the invention is that it cannot be easily or inadvertently triggered. It requires a pull on the trigger pin only from the inside of the trap.

Another feature is that the trap is safe in that it does not harm humans, pets or even the animal intended to be trapped since there is no fast action strong spring or heavy weight dropping. The door closure does not strike the animal with sufficient force to injure the animal and hence if a pet or a human hand is in the trap injury does not result.

Other objects of the present invention will become apparent upon reading the following specification and referring to the accompanying drawings in which similar characters of reference represent corresponding parts in each of the several views.

Figure 1:
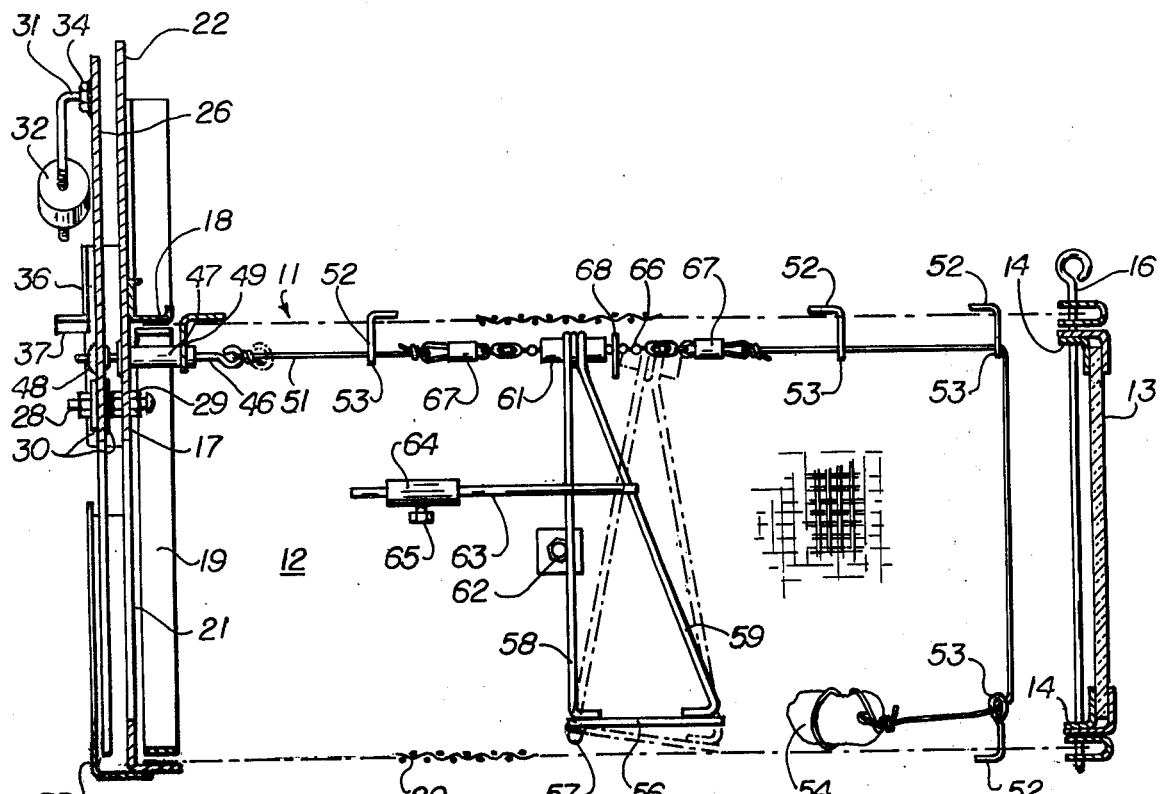
FIG. 1 is a vertical sectional view through one form of trap in accordance with the present invention with the closure in open position.

In accordance with the present invention a body 11 is provided which is here shown to be of screen material, a desirable quality being the fact that an animal can see into the trap and be attracted by the bait and not fear enclosure. Thus the body 11 may be a glass jar, or perforated metal or of other construction. The sides 12 are preferably in the shape of an inverted U. As shown herein the back 13 is transparent — i.e. plastic or glass — and may be removable, in which case the back 13, bottom 20 and sides 12 have inward extending, overlapping flanges 14 through which closure pins 16 pass to removably secure the back 13 in place.

The front end 17 is formed with an inward extending flange 18 which engages the sides 12 and bottom 20 of body 11. A stiffener 19 may be formed and inserted in the front of the body 11 to hold the front in place. An opening 21 is formed in the bottom of front end 17 of a size to permit animals to enter the body 11. An upward extension 22 of front end 17 is provided for a purpose which hereinafter appears.

Closure 26 is placed immediately forwardly of front end 17 and extension 22 and rotates parallel thereto about a horizontal axis of rotation. A cut out 27 is formed in closure 26 to reduce weight thereof and also to insure that the opening 21 is not blocked by the closure 26 when the closure is in open position. A pivot pin 28 provides for the rotation of the closure 26 and passes through a hole in the front end 17. To reduce friction, bushing 29 may be forced into the hole in the front end 17, functioning not only to reduce friction but also to space the closure 26 a short distance in front of the end 17. Washers 30 may be positioned around the pin 28 on either side of the closure 26 to further reduce friction of the closure.

Means is provided to counter-weight the closure 26 to compensate for the material removed in opening 27. Thus the weight of closure 26 minus the weight of counter-weight 32 results in the closure tending to rotate clockwise from the open position of FIG. 2 to the closed position of FIG. 3 when the trigger is pulled. However, counter-weight 32 is sufficient so that binding of the trigger mechanism is avoided. Once the closure moves past dead center, weight 32 accelerates closing. As here shown, one means of counter-weighting is the use of a threaded rod 31 connected to closure 26 having an internally-threaded counter-weight 32 thereon. Rod 31 is attached to closure 26 by anchor 34. By adjusting the position of the weight 32, the desired trigger sensitivity may be achieved.

To prevent the closure 26 from being pushed outwardly by an animal, the periphery of the closure 26 is behind retainer 33 fixed to flange 18 or other portion of the body 11 slightly overlapping the periphery of closure 26 around the bottom of the opening 21. Thus when the closure is in closed position, (FIG. 3) an outward push by the animal through the opening 21 does not enable the animal to escape.

Figure 2:
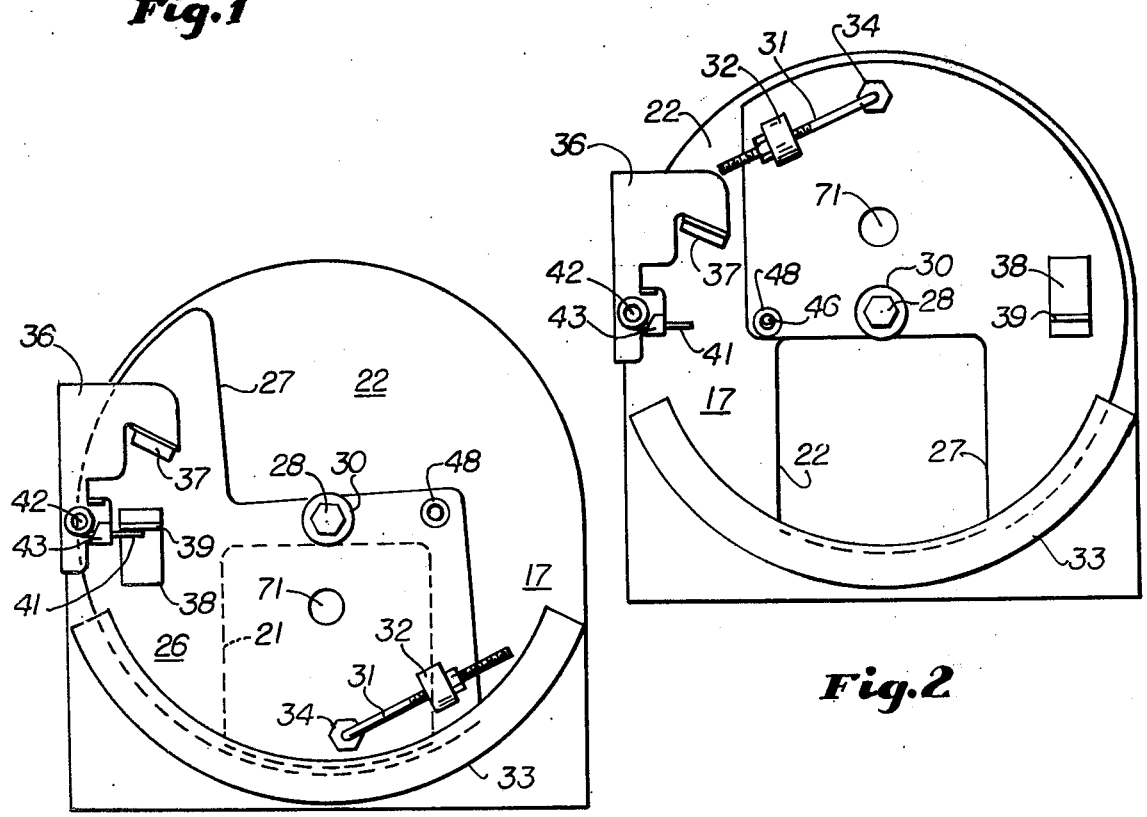
FIG. 2 is a front elevational view from the left of FIG. 1.
Figure 3:
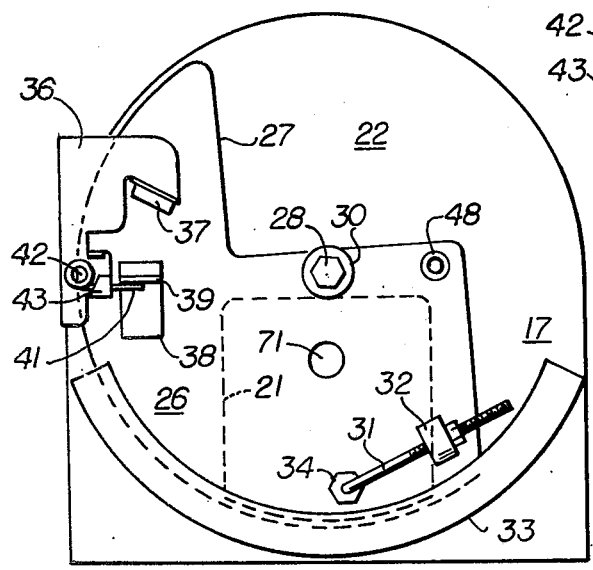
FIG. 3 is a view similar to FIG. 2 showing the trap in closed position.

In a preferred embodiment herein illustrated, a stop 36 is fixed to end 17 and has a bumper pad 37 against which the flange 39 of bumper 38 fixed to closure 26 bumps when the closure 26 rotates from the open position of FIG. 2 to the closed position of FIG. 3. This limits the extent of movement of the closure 26 and also reduces noise. To prevent the closure from being pulled open, a latch 41, which is pivoted by means of pivot pin 42 to the bumper 36 or other convenient location, drops behind the flange 39 as shown in FIG. 3 and holds the closure in closed position. It will be understood that when the closure 26 is turning in a clockwise direction, the latch 41 is pivoted up out of the way of the flange 39 but drops behind the flange 39 as the latter moves on toward the bumper pad 37. When it is necessary to open the closure 26, it is turned in a clockwise direction until the pin 41 may be pivoted out of the way and then moved in a counter-clockwise direction to its open position. To hold the latch 41 in proper position, a latch retainer 43 may be formed on the bumper 36 spaced slightly forward from the plane of oscillation of the latch 41.

A sliding trigger arrangement is preferably used to hold the closure 26 in the open position of FIG. 2. Trigger pin 46 is preferably of a metal which has been hardened or plated to reduce friction and prevent scoring. It slides horizontally — i.e., transverse to the plane of closure 26. Preferably pin 46 is mounted for sliding movement in a sleeve 47 of nylon or other low friction material held in position by means of support 49 connected to the body 11. A bushing 48 is preferably inserted in an aperture in the closure 46 in alignment with pin 46 when the closure 26 is in full open position. So long as the pin 46 is within the bushing 48, the closure 46 is prevented from swinging about pivot 28. When the pin 46 is pulled to the right (as viewed in FIG. 1) so that it is free of the bushing 48, the weight of the door causes the latter to swing to the closed position of FIG. 3 in a clockwise direction. After counter-weight 32 passes over pivot 28, the weight 32 accelerates closure. Preferably the diameter of the pin 46 is small compared with internal diameter of the bushing 48 so that the sensitivity of the trigger mechanism can be tested while the closure 26 is in open position.

Two means are illustrated in FIG. 1 for pulling the pin 46, it being understood that either or both may be used.

In the simplest version of the trigger, a cord or wire 51 tied to pin 46 runs horizontally rearwardly near the top of the body 11, thence downwardly to the bottom and thence forwardly. For such purpose a plurality of guides 52 are attached to the body 11 having eyes 53 at their inner ends through which the latch cord or wire 51 passes. Bait 54 is tied or otherwise affixed to the end of cord 51. Particularly for animals which tend to run away with bait, the simple arrangement described is successful. The animal grabs the bait 54 and moves toward the front of the trap, pulling the cord 51 and causing the pin 46 to retract to trigger the trap as has heretofore been explained.

A further means to trigger the trap consists of a foot treadle 56 located near the bottom of the body 11 in proximity to bait 54, pivoted on a transverse horizontal pivot axle 57 which is fixed at its opposite ends to the body 11. Front and rear arms 58, 59 are attached to the treadle 56 and their upper ends are fixed to sleeve 61. Preferably the treadle 56 is counter-weighted by means of an arm 63 which may be threaded and adjustable on the counter-weight arm 63 is a counter-weight 64. Counter-weight 64 may be threaded onto the threaded arm 63 or it may be held in place by means of a set screw 65 or other convenient means. A stop 62 limits the upward or counter-clockwise movement of the treadle 56, said stop 62 being fixed to the body 11. In a preferred version of the invention, a ball and link chain 66 slides through the sleeve 61 and its opposite ends are attached by means of swivel connectors 67 at either end to the cord or wire 61. A contact 68 is fixed to chain 66 in such position that, when the treadle 56 is depressed, sleeve 61 moving to the right as viewed in FIG. 1 contacts the contactor 68 and causes the cord 51 to be pulled to the right, thereby retracting pin 46 from the bushing 48. It will be seen that in this version of the trigger mechanism either an animal pulling the bait 54 to the left or an animal stepping on the treadle 56 will cause the pin 46 to retract. The treadle arrangement is preferred for use with animals of the type which tend to gnaw the bait in place since the weight of the animal on the treadle 56 while reaching for the bait will cause the trigger to release the closure 26.

Weight 64 negatively biases treadle 56 slightly to prevent tension being applied to the trigger end. It should be apparent that weight 64 is opposite to the closure bias of weight 32.

Hole 71 may be found in closure 26. When the closure is in closed position, hole 71 occupies the attention of the trapped animal and the animal does not try to turn the closure counter-clockwise. The size of hole 71 is varied depending on the size of animal intended to be trapped. Preferably hole 71 is large enough so the animal may extend his head up to the eyes.

What is claimed is:

1. An animal trap comprising a body having an entrance end, a substantially planar cover for said entrance end formed with a first aperture for entrance of an animal into said body, a closure formed with a second aperture, means mounting said closure parallel to said cover for oscillation between a first position with said apertures aligned and a second position with said closure blocking said first aperture, said closure being weighted to fall from first to second positions, a trigger pin, said closure being formed with a third aperture in alignment with said pin when said closure is in first position and fitting through said closure to hold said closure in first position, means mounting said trigger pin relative to said cover for reciprocation, and trigger pin actuating means to pull said pin away from said closure, said actuating means being actuated by an animal from within said body, said actuating means before being actuated applying no pulling force on said trigger pin and a counter weight on said closure, whereby said closure in first position does not interfere with reciprocation of said trigger pin, said means mounting said trigger pin comprising a horizontal sleeve fixed to said cover through which said pin passes and a bushing on said closure having a bore larger than said pin, said pin fitting through said bushing.

2. A trap according to claim 1 in which said trigger pin actuating means comprises a cord, guides on said body for said cord, said cord extending to a position on the bottom of said body remote from said cover and capable of being tied to bait, whereby an animal pulling said bait retracts said pin from contact with said closure, said core being normally relaxed until pulled taut by an animal pulling said bait.

3. A trap according to claim 1 in which said trigger pin activating means comprises a treadle, means pivotally mounting said treadle near the bottom of said body remote from said cover about a horizontal axis, an arm moving with said treadle, and means articulately connecting said arm to said pin whereby an animal stepping on said treadle pulls said pin from contact with said closure.

4. A trap according to claim 1 which further comprises an arcuate retainer fixed to said cover and overlapping a portion of the periphery of said closure on the side of said closure opposite said cover, said retainer preventing an animal from pushing said closure away from said cover, cooperating latch means on said cover and closure to hold said closure in second position, said latch means being manually disengageable, and a bumper on said end adjacent said latch means to limit movement of said closure, said bumper having a resilient pad.

5. A trap according to claim 1 which further comprises a hole in said closure located near the bottom of said trap when said closure is in second position to occupy the attention of an animal in said trap.

6. An animal trap comprising a body having an entrance end, a substantially planar cover for said entrance end formed with a first aperture for entrance of an animal into said body, a closure formed with a second aperture, means mounting said closure parallel to said cover for oscillation between a first position with said apertures aligned and a second position with said closure blocking said first aperture, said closure being weighted to fall from first to second positions, a trigger pin, said closure being formed with a third aperture in alignment with said pin when said closure is in first position and fitting through said closure to hold said closure in first position, means mounting said trigger pin relative to said cover for reciprocation, and trigger pin actuating means to pull said pin away from said closure, said activating means being actuated by an animal from within said body, said trigger pin activating means comprising a cord, guides on said body for said cord, said cord extending to a position on the bottom of said body remote from said cover and capable of being tied to bait, a treadle, means pivotally mounting said treadle near the bottom of said body remote from said cover about a horizontal axis, an arm fixed to said treadle and having a sleeve on its upper end through which said cord passes, a contactor on said cord positioned to be moved by said sleeve to pull said pin, whereby an animal pulling said bait retracts said pin by pulling said cord or an animal stepping on said treadle pulls said cord and retracts said pin.

* * * * *